Patented May 18, 1954

2,678,946

UNITED STATES PATENT OFFICE 2,678,946

PROCESS OF PREPARING NITROXY ALKYL NITRAMINES

Alfred T. Blomquist and Fred T. Fiedorek, Ithaca, N. Y., assignors to the United States of America as represented by the Secretary of the Navy No Drawing. Application December 30, 1944, Serial No. 570,804

11 Claims. (Cl. 260—467)

The present invention relates to nitramines and more particularly to a new and improved method of preparing the nitramines of certain types of aliphatic secondary amines.

The aliphatic nitramines comprise a group of organic compounds of increasing interest at the present time because of the explosive properties of several members of the class that have recently come into prominence; notably, cyclonite (I), homocyclonite (II), Haleite (III), and DINA (IV).

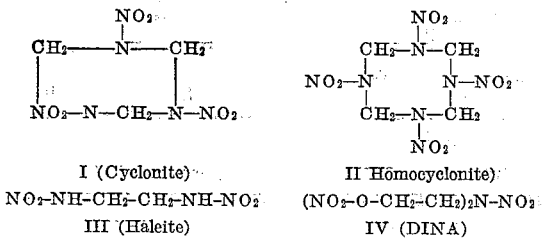

I (Cyclonite)
NO₂-NH-CH₂-CH₂-NH-NO₂
III (Haleite)

II (Homocyclonite)
(NO₂-O-CH₂-CH₂)₂N-NO₂
IV (DINA)

These four nitramines are all considerably more powerful than TNT, with ballistic strengths ranging from about 1.3 to about 1.5 times that of TNT. Furthermore, the last mentioned compound in this group, i. e., DINA, is an essentially non-volatile compound that is capable of plasticizing nitrocellulose. It is therefore of interest as a replacement for the relatively volatile nitroglycerine heretofore used in propellants of the double base type.

Because of the increasing importance of this class of compounds as a whole, new methods of preparing various types of nitramines are of particular interest. The provision of a greatly improved method of preparing one particular subclass of nitramines may therefore be said to constitute one of the objects of the present invention.

The particular subclass of nitramines with which the present invention is primarily concerned consists of nitramines that contain one or more nitroxyalkyl groups in addition to a nitramino group, and which possess the characteristic structure:

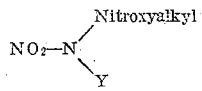

where Y is either a nitroxyalkyl group, or an alkyl group (either alicyclic or cyclic), or a substituted alkyl group. A typical example of this type of nitramine is the previously mentioned bis(2-nitroxyethyl) nitramine (DINA).

Heretofore DINA constituted the only known example of a nitramine containing a nitroxyalkyl group and for this reason the preparation of DINA will serve to illustrate the difficulties encountered in the preparation of a compound of this general type by the prior art methods.

As described and claimed in the copending applications of Wright and Chute, Serial No. 570,814, now Patent 2,462,052, and Cason, Serial No. 570,811, both filed of even date herewith, DINA has heretofore been prepared from diethanolamine by the following series of reactions, the second of which is catalyzed by chloride- or bromide-ion forming material:

(a)

NH(CH₂CH₂OH)₂+3HNO₃ ⟶ N̄H₂(CH₂CH₂ONO₂)₂+2H₂O
NO₃⁻

(b)

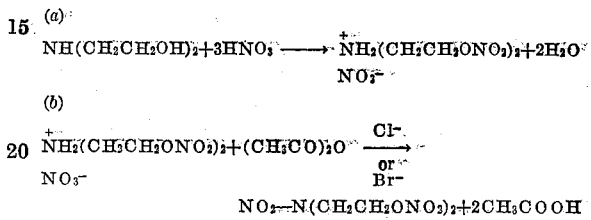

Two modifications of this basic procedure have been proposed by Wright and Chute. The first or "one-stage" modification involves the treatment of the appropriate secondary amine (diethanolamine) with an equivalent amount (3 moles) of nitric acid and an equivalent amount (3 moles) of acetic anhydride in the presence of a halide-ion-forming catalyst such as a chloride. The second or "two-stage" modification involves the initial conversion of the appropriate amine (diethanolamine) to the corresponding bis(nitroxyalkyl) amine nitrate, after which the isolated salt is treated in a second stage reaction with acetic anhydride in the presence of an appropriate catalyst.

Neither of these modifications proved to be entirely satisfactory for large-scale manufacturing operations. On the one hand, the one-stage modification was somewhat difficult to regulate thermally because of the large amount of heat evolved from the two reactions taking place in the reaction mixture. Furthermore, it has been found that certain alkanolamines tend to inflame when added to a mixture of the nitric acid, the anhydride and the catalyst. The two-stage modification, on the other hand, though more satisfactory from the point of view of temperature regulation, required the use of a very large excess of substantially anhydrous nitric acid in order to convert the diethanolamine to the bis(nitroxyethyl) amine nitrate. In isolating this salt, this large excess of nitric acid was wasted, inasmuch as isolation involved the drowning of the reaction mixture in a large volume of ice water. Thus Wright and Chute in application Serial No. 570,814, now Patent 2,462,052, employed 60 moles of 99–100% nitric acid to convert 4 moles of diethanolamine to the bis(nitroxyethyl)amine nitrate. This corresponds to five times the equivalent amount of nitric acid theoretically required. The reaction mixture resulting from this treatment was then poured into 6 kg. of ice water. It will therefore be apparent that the two-stage modification, while more satisfactory from the viewpoint of temperature control, involves the loss of a very large proportion of anhydrous nitric acid and also requires the isolation and handling of a solid prior to the second stage of the process.

Broadly speaking, the object of the present invention is to provide a new and improved method of converting a secondary amine having one or more alkanol groups, to the corresponding nitramine containing one or more nitroxyalkyl groups.

A more particular object is to improve the ease of thermal regulation and at the same time to minimize the nitric acid consumption in the conversion of certain secondary amines containing one or more alkanol groups to the corresponding nitramines having one or more nitroxyalkyl groups.

Still further objects are to avoid the hazard created by the tendency of certain secondary alkanolamines to inflame when contacted with a mixture of anhydrous nitric acid and acetic anhydride containing a bromide or chloride catalyst; and to provide an improved procedure that is more readily adaptable to large scale manufacture in either a batch or continuous type of operation.

Other objects and advantages will be apparent as the invention is hereinafter more fully described.

The foregoing objects may be accomplished by the two-stage process of the present invention which is applicable to those secondary amines containing one or more alkanol groups, that are capable of forming a normally liquid mixture when mixed with approximately the theoretically equivalent amount of substantially anhydrous nitric acid. In the first stage of the process, the selected secondary amine containing one or more alkanol groups is merely mixed with approximately the equivalent amount of substantially anhydrous nitric acid to form a liquid mixture. The heat liberated during mixing is readily removed, for which reason thermal regulation of this and the subsequent stage of the process is a relatively simple matter.

The first stage reaction mixture probably contains the amine nitrate salt but the hydroxyl groups in the indicated class of alkanolamines apparently are not completely esterified. It is perhaps for this reason that the amine nitrate salt of the indicated class of alkanolamines remains in solution in approximately a theoretically equivalent amount of nitric acid. In any event, regardless of the explanation, the first stage reaction mixture consists of a liquid, and it is therefore readily adaptable to being continuously fed to the reaction system wherein the second stage of the process is to be carried out.

The second stage of the process is effected by bringing the liquid first-stage reaction mixture into reactive relation with an approximately equivalent amount of a dehydrating acid anhydride, in the presence of an appropriate halide-ion-forming catalyst, at the selected reaction temperature, preferably between about 5° C. and about 65° C. Thereafter the second stage reaction mixture is diluted with water and the resulting precipitate is separated from the mother liquor.

In carrying out the first stage of the process a large excess of nitric acid is not necessary. Indeed we prefer to use roughly from 1 to 1.2 equivalents of nitric acid per mole of amine undergoing treatment. If the starting material contains but one secondary amine nitrogen and but one hydroxyl group, two moles of nitric acid per mole of amine is of course one equivalent of nitric acid. If the starting material contains either two hydroxyl groups and one secondary amine nitrogen group, or one hydroxyl and two secondary amine nitrogens, then three moles of nitric acid per mole of the starting amine is one equivalent of nitric acid. The computation of the equivalent amount of nitric acid is therefore a relatively simple matter and in carrying out the first stage of the process, the theoretically equivalent amount of nitric acid is preferably increased somewhat by multiplying the theoretical amount by a factor of 1 to about 1.2. Thus the nitric acid consumption is reduced by a factor of almost five and at the same time optimum yields are obtained. In short, the use of more than about 1–1.2 equivalents of nitric acid per mole of amine is unnecessary and any amount in excess of 1–1.2 equivalents is to be regarded as surplusage.

The temperature during the first and second stages of the process may be varied within wide limits. The first stage may be carried out between about 5° C. and about 50° C., the lower limit depending partly upon the solubility of the amine salt in nitric acid, and the upper limit depending largely upon safety considerations. Preferably the first stage is carried out between about 10° C. and about room temperature or slightly thereabove. During the second stage the reaction may be effected between about 5° C. and about 65° C. or above, optimum yields generally being obtained at a reaction temperature roughly between about 30° C. and about 45° C.

In carrying out the first and second stages of the process, it is immaterial whether the reaction components are simultaneously introduced into the reaction vessel, or introduced successively. In small scale runs, the addition of one component to a vessel containing the remaining component or components is usually more convenient while in large scale runs simultaneous addition may be preferable.

The catalyst employed during the second stage may consist of any of the chloride-ion or bromide-ion forming materials described in Wright and Chute, application Serial No. 570,814, now Patent 2,462,052, and in the above mentioned Cason application. We prefer, however, to use the chloride-ion-forming catalysts such as hydrogen chloride, metal chlorides, amine hydrochlorides, or fatty acid chlorides such as acetyl chloride, the latter being especially convenient for laboratory-scale preparations because of its liquid condition.

Generally speaking, the process of the present invention is applicable to those secondary amines containing one or more alkanol groups, that dissolve in an approximately equivalent amount of substantially anhydrous nitric acid to form a normally liquid mixture. As illustrative members of this class of starting materials, the following may be mentioned: diethanolamine, ethanolmethylamine, ethanolethylamine, ethanolbutylamines; isopropanolmethylamine and the like.

Certain of the products obtained by the process of the present invention are more particularly described and claimed as new compounds in one or more of the following copending patent applications, all of which are filed of even date herewith: Wright and Chute application Serial No. 570,813, now Patent 2,461,582; and Blomquist and Fiedorek application Serial No. 570,805, now Patent 2,481,283.

In order more clearly to disclose the nature of the present invention, several specific examples will hereinafter be described in considerable detail. It is to be clearly understood, however, that this is done solely by way of illustration and not for the purpose of delineating the breadth of the present invention or of restricting the ambit of the appended claims.

*Example I.—Two-stage liquid-feed preparation of bis(2-nitroxyethyl)nitramine (DINA)*

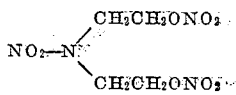

A mixture of diethanolamine and nitric acid was prepared by slowly adding 52.5 g. (0.5 moles) of diethanolamine (DEA) to 101.6 g. (1.58 moles) of nitric acid (note 1), while maintaining the temperature of the reaction at 15°–20° C., by means of external cooling (note 2). This reaction was carried out in a 500 cc., three-necked flask, provided with stirrer, thermometer, and dropping funnel. Moderate stirring was employed through the addition of the amine to the nitric acid (note 3).

The solution (154.1 g.) of diethanolamine in nitric acid was transferred to a dropping funnel and added dropwise to a solution of 0.86 g. (0.011 mole) of acetylchloride (note 4) and 177 g. (1.73 moles) of acetic anhydride (note 5) contained in a 500 cc., three-necked flask. Stirring was employed throughout the addition, which required fifteen minutes, and the temperature was maintained at 35° C. by means of intermittent cooling with an ice and water bath. The reaction mixture was held at 35° C. for fifteen minutes after addition of the reactants was completed and then poured into 1200 cc. of ice and water. Vigorous stirring was used during the quenching operation and in a short time DINA precipitated as a chalky, white solid. The substance was filtered, washed thoroughly with two 100 cc. portions of water, air dried and desiccated in vacuum over phosphorus pentoxide for 24 hours. There was obtained 114 g. (95 per cent theoretical) of crude DINA melting at 49.5–50.5° C.

NOTES

1. Nitric acid assaying 98.1% total acidity calculated as $HNO_3$ was employed. Nitrous acid determination on the nitric acid used showed presence of approximately 0.65% $HNO_2$.

2. At temperature below 10° C. crystals of a solid tend to separate from the diethanolamine-nitric acid solution when nearing the theoretical ratio of the reactants. Upon warming up to 20° C. the solid dissolves rapidly.

3. For a series of comparative runs it is convenient to prepare a larger quantity of diethanolamine-nitric acid solution and use weighed portions. This can be prepared conveniently by adding concurrently and simultaneously the proportionate amounts of diethanolamine and 98% nitric acid to a small batch of mixture previously prepared separately. A reaction temperature of 20° C., maintained by external cooling, is satisfactory.

4. For catalyst trials the substance to be tested was introduced instead of acetyl chloride, in solution or suspension in the acetic anhydride.

5. Baker and Adamson acetic anhydride which was assayed as 100% $Ac_2O$ by titration with standard alkali was used. This material was labelled "95% acetic anhydride."

(1) *Optimum temperature.*—A series of experiments to determine the effect of temperature on the yield and quality of DINA produced by the foregoing procedure disclosed that maximum yields and higher quality of DINA were obtained at operating temperatures in the range 35–45° C. At higher or lower temperatures the yields diminished markedly and the quality of the DINA, as observed from the melting point of the product, was somewhat inferior.

The experiments summarized in Table I were carried out using 0.5 mole of diethanolamine, 1.58 moles of 98 per cent nitric acid, 1.73 moles of acetic anhydride, and 0.011 moles of acetyl chloride.

TABLE I.—INFLUENCE OF TEMPERATURES IN THE CONVERSION OF DEA-$HNO_3$ SOLUTION TO DINA [1]

| Exp. No. | Temp. (° C.) | DINA (g.) | Yields (percent) | M. P. (° C.) |
|---|---|---|---|---|
| XIII | 5 | 14.0 | 12 | 48–49 |
| XIV | 15 | 60.3 | 50 | 48.5–49.5 |
| XV | 25 | 98.2 | 82 | 50–51 |
| XVI | 35 | 114.7 | 96 | 50.5–51.5 |
| XVII | 45 | 113.9 | 95 | 49–50 |
| XVIII | 55 | 73.2 | 61 | 46.5–48.5 |

[1] Procedure described above was employed. The diethanolamine was obtained from Carbide and Carbon Chemicals Corporation and was used without further purification.

(2) *Catalysts in the preparation of DINA.*—A preliminary survey of possible catalysts is shown in Table II. Wright and Chute (application Ser. No. 570,814, now Patent 2,462,052, filed of even date herewith) have demonstrated the catalytic action of various chlorides for the conversion of the nitrate of bis-N,N-(2-nitroxyethyl)amine to DINA and Cason (application Ser. No. 570,811, filed of even date herewith) obtained catalytic effects with certain bromides. It has also been found that hypochlorites and chlorates are effective as catalysts. Potassium perchlorates, on the other hand, was ineffective, and so was chloroacetic acid. Sulfur monochlorides, acetyl chloride, and nitrosyl chloride gave 87.6, 93.8–95.6, and 87.7 per cent yields of DINA, respectively. Ammonium bromide gave a small yield (3.0 per cent) of DINA and potassium bromate catalyzed the formation of DINA to a slightly greater degree (6.7 per cent).

The yields of DINA with hypochlorite and chlorate as catalysts at 35° and 45° C. paralleled those with acetyl chloride at 35° and 45° C. (cf. Table II). In all cases the yield at 45° C. was slightly less than at 35° C.

(3) *Effect of various concentrations of catalyst.*—The yield of DINA is also subject to the influence of the concentration of the catalyst as shown in Table II relating to experiments employing acetyl chloride and in Table IV relating to experiments employing potassium chlorate. There is an optimum concentration at which the catalyst is most effective. The highest yields were obtained when 0.011 mole of catalyst per 0.50 mole of DEA was used.

TABLE II.—CATALYSTS FOR CONVERSION OF DEA TRINITRATE TO DINA [1]

| Exp. No. | Catalyst [2] (0.011 mole/0.5 mole) | DINA (g.) | Yield (percent) | M. P. (° C.) |
|---|---|---|---|---|
| 1 | AcCl | 112.6 | 93.8 | 50-51 |
| 2 | NH₄F | 0 | 0 | |
| 3 | Na₂S | 0 | 0 | |
| 4 | Cu(NO₃)₂.3H₂O | 0 | 0 | |
| 5 | NaCN | 0 | 0 | |
| 6 | NaN₃ | 0 | 0 | |
| 9 | KClO₃ (35° C.) | 111.2 | 92.7 | 48-50 |
| 20 | KClO₃ (45° C.) | 110.4 | 92.0 | 48.5-50 |
| 21 | Ca(OCl)₂ (35° C.) | 111.8 | 93.2 | 49-51 |
| 22 | Ca(OCl)₂ (45° C.) | 109.4 | 91.2 | 49-50 |
| 23 | I₂ | 0 | 0 | |
| 24 | KBrO₃ | 8.0 | 6.7 | 43.0-44.5 |
| 25 | ClCH₂CO₂H | 0 | 0 | |
| 26 | Na p-toluenesulfonamide | 0 | 0 | |
| 27 | NH₄NO₃ | 0 | 0 | |
| 28 | HCO₂H | 0 | 0 | |
| 29 | NH₄Br | 3.6 | 3.0 | 50-51 |
| 30 | H₃PO | 0 | 0 | |
| 31 | NaAs₄O₂ | 0 | 0 | |
| 32 | Me₂SO₄ | 0 | 0 | |
| 33 | S₂Cl₂ | 105.1 | 87.6 | 49-50 |
| 34 | 2-naphthalenesulfonic acid | 0 | 0 | |
| 37 | Na₂B₄O₇.10H₂O | 0 | 0 | |
| 38 | Na₂MoO₄.2H₂O | 0 | 0 | |
| 46 | KCNS | 0 | 0 | |
| 48 | H₂TeO₄.2H₂O | 0 | 0 | |
| 50 | NOCl | 105.2 | 87.7 | 48.5-50 |
| 59 | KClO₄ | 0 | 0 | |

[1] Procedure described above was followed, using DEA obtained from Carbide and Carbon Chemical Corporation.
[2] Where the conversion of the amine nitrate to DINA was incomplete the quenching was carried out using 2 liters of water in order to dissolve the unreacted salt.

TABLE III.—YIELDS OF DINA USING VARIOUS AMOUNTS OF ACETYL CHLORIDE AT 35° C.[1]

| Exp. No. | AcCl (moles) | DINA (g.) | Yield (percent) | M. P. (° C.) |
|---|---|---|---|---|
| 42 | 0.001 | 14.7 | 12.3 | 51-52 |
| 41 | 0.005 | 92.8 | 77.3 | 48-50 |
| 16 | 0.011 | 114.7 | 95.6 | 50.5-51.5 |
| 44 | 0.022 | 109.2 | 91.0 | 49-50 |
| 45 | 0.10 | 105.2 | 87.7 | 49-50 |
| 48 | 0.50 | 90.8 | 75.7 | 42.5-43 |

TABLE IV.—YIELDS OF DINA WITH VARIOUS AMOUNTS OF POTASSIUM CHLORATE, 35° C.[1]

| Exp. No. | KClO₃ (moles) | DINA (g.) | Yield (percent) | M. P. (° C.) |
|---|---|---|---|---|
| 40 | 0.001 | 4.2 | 3.5 | 50-51.5 |
| 39 | 0.005 | 60.9 | 50.8 | 49.5-50.5 |
| 19 | 0.011 | 111.2 | 92.7 | 48-50 |
| 43 | 0.022 | 105.1 | 87.6 | 49-50.5 |
| 44 | 0.10 | 99.0 | 82.5 | 49-50.5 |

[1] Procedure described above was used, with DEA obtained from Carbide and Carbon Chemical Corporation.

(4) *Influence of various amounts of acetic anhydride in the preparation of DINA.*—The results of several experiments disclosed that a slight excess (about 15 per cent) of acetic anhydride over the theoretical requirements gave the optimum yield of DINA in the second stage. With a quantity of anhydride either greater or less than a 15 per cent excess, a decrease in the yield of DINA was observed. These experiments are summarized in Table V.

TABLE V.—YIELDS OF DINA WITH VARIOUS AMOUNTS OF ACETIC ANHYDRIDE [1]

| Exp. No.[2] | Ac₂O (moles) | DINA (g.) | Yields (percent) | M. P. (° C.) |
|---|---|---|---|---|
| 54 | 1.25 | 76.1 | 63.4 | 47-49 |
| 53 | 1.50 | 88.3 | 73.6 | 45-50 |
| 57 | 1.575 | 98.8 | 82.3 | 47-49 |
| 56 | 1.65 | 108.3 | 90.3 | 48-50 |
| 12 | 1.73 | 113.8 | 94.8 | 49-50 |
| 55 | 2.00 | 109.0 | 90.8 | 48.5-49.5 |

[1] Procedure described above was used, using 0.5 mole DEA, 1.58 moles nitric acid, 0.011 mole acetyl chloride, and various amounts of anhydride.
[2] DEA from Dow Chemical Company was used in 52-58.

(5) *Effect of various quantities of nitric acid.*—Several runs with various amounts of nitric acid in the foregoing procedure have been made. The results are given in Table VI.

TABLE VI.—EFFECT OF VARIATIONS IN THE EXCESS OF NITRIC ACID IN THE TWO-STAGE, LIQUID-FEED PROCEDURE [1]

| Run No. | Nitric Acid | | Yield | | M. P. ° C. |
|---|---|---|---|---|---|
| | Moles | Percent Excess | Grams | Percent | |
| 60 | 1.500 | 0.0 | 89.8 | 72.3 | 50.5-52 |
| 61 | 1.537 | 2.5 | 110.0 | 88.7 | 47.0-50 |
| 52 | 1.580 | 5.3 | 113.8 | 91.7 | 49.5-50 |
| 62 | 1.612 | 7.5 | 113.7 | 91.6 | 49.5-50 |
| 63 | 1.650 | 10.0 | 97.6 | 78.6 | 48.0-50 |

[1] DEA from Dow Chemical Company was used in all runs.

(6) *Effect of dilution of the second-stage reaction mixture.*—A number of runs were made in which the foregoing procedure was altered with respect to the dilution of the reaction mixture prior to filtration of the crude DINA. The runs listed in Table VII were all made diluting to 30 percent acetic acid and filtering at 20° C. In each case the product was washed with seven 100 cc. portions of water until alkaline to bromcresol green.

TABLE VII.—PREPARATION OF DINA BY THE TWO-STAGE, LIQUID-FEED PROCEDURE; DILUTING TO 30 PER CENT ACETIC ACID [1]

| Run No. | Yield | | M. P. ° C. |
|---|---|---|---|
| | Grams | Percent | |
| 71 | 107.7 | 86.8 | 48-51 |
| 72 | 108.4 | 87.5 | 49-50 |
| 64 | 106.7 | 86.0 | 49.5-50 |

[1] DEA from Dow Chemical Co. used in all runs.

(7) *Effect of varying the holding time in the preparation of DINA by the two-stage, liquid-feed procedure.*—Results of several experiments in which the holding time of the foregoing DINA preparation was varied disclosed that the reaction was practically complete in 10 minutes. Lengthening the holding time improved the yield but slightly.

*Example II.*—*Two-stage, liquid-feed preparation of N-(2-nitroxyethyl) methyl nitramine (Me-NENA)*

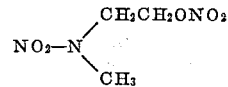

The following procedures are typical of the two-stage preparation of Me-NENA, using a mixture of nitric acid (98 per cent) and methyl ethanolamine instead of the solid dinitrate.

(1) *Procedure A.*—A mixture of methyl ethanolamine and nitric acid was prepared by slowly adding 37.5 g. (0.5 mole) of methyl ethanolamine to 64.5 g. (1.0 mole) of 98% nitric acid, while maintaining the temperature of the reaction below 10° C. by means of external cooling. This reaction was carried out in a 500 cc., three-necked flask, provided with a stirrer, thermometer and a capillary tipped dropping funnel, the end of which was immersed below the surface of the nitric acid. Moderate stirring was employed throughout the addition.

The mixture of methyl ethanolamine and nitric acid was transferred to another dropping funnel and added dropwise to a solution of 3 g. (0.022 mole) of zinc chloride and 118 g. (1.1 mole) of 95% acetic anhydride, contained in 500 cc., three-necked flask. Stirring was employed throughout the addition which required fifteen minutes and the temperature maintained at 15° C. by means of intermittent cooling in an ice or water bath. After stirring for an additional ten minutes the solution was heated to 40° C. and kept at this temperature for twenty minutes. (Little heat evolution occurs at this temperature when the addition is carried out at room temperature or higher. However, if the addition is carried out below room temperature there is considerable heat evolution upon heating.) The reaction was quickly cooled to room temperature and then poured slowly over 550 g. of ice and water, employing vigorous stirring. A sandy precipitate of Me-NENA formed which was filtered off and washed with two 50 cc. portions of water. After air drying for twenty-four hours, it was desiccated in vacuum over phosphorus pentoxide for another twenty-four hours. The crude material (crop 1) weighed 64.6 g. and melted at 38–39° C.

A second crop of Me-NENA can be obtained by neutralizing the filtrate from the first crop. When the above filtrate was neutralized with approximately 195 g. of sodium bicarbonate, a small amount of precipitate formed which was filtered and washed with two 25 cc. portions of water. There was obtained 7.8 g. of solid (crop 2) melting at 37–38° C.

The combined yield of crude Me-NENA by this procedure was 72.4 g. or 88 percent of the theoretical.

(2) *Procedure B.*—A mixture of 37.5 g. (0.5 mole) of methyl ethanolamine and 64.5 g. (1.0 mole) of 98% nitric acid was prepared employing the directions given in procedure A.

The second step in the preparation of Me-NENA is best carried out in a 500 cc., three-necked flask fitted with stirrer, thermometer, and dropping funnel. The mixture of methyl ethanolamine and nitric acid was added dropwise with stirring to a solution of 3 g. (0.022 mole) of zinc chloride and 118 g. (1.1 mole) of acetic anhydride maintaining the temperature of the reaction at 35° C. by means of intermittent cooling. The addition required 15 minutes and after it was completed, the reaction was stirred for an additional fifteen minutes at the same temperature and then poured over 550 g. of ice and water employing vigorous stirring. Me-NENA precipitated and was filtered. After washing twice with 50 cc. portions of water the product was air dried. The final trace of moisture was removed by vacuum desiccation over phosphorus pentoxide. The crude product (crop 1) weighing 66.1 g. melted at 38–39° C.

(3) *Procedure C.*—A mixture of methyl ethanolamine and 98% nitric acid was prepared following the directions of procedure A using in this case 37.5 g. (0.5 mole) of the amine and 67.7 g. (1.05 moles) of acid.

The subsequent step was carried out in a 500 cc., three-necked flask, provided with stirrer, thermometer and dropping funnel. The amine-nitric acid solution was added dropwise to a solution of 1.5 g. (0.011 mole) of zinc chloride in 118 g. (1.1 moles) of acetic anhydride, keeping the temperature of the reaction at 35° C. After the addition, which required fifteen minutes, the reaction was stirred for an additional fifteen minutes at the same temperature and immediately poured into 550 g. of ice and water. Vigorous stirring was employed. The precipitate was filtered off and washed with two 50 cc. portions of water and then allowed to dry in air. The final trace of moisture was removed by drying in vacuum over phosphorus pentoxide. The crude product (crop 1) weighed 70.1 g. and melted at 37.5–38° C.

An additional quantity of Me-NENA can be isolated from the filtrate from crop 1 by neutralizing the acid with a calculated amount of sodium bicarbonate. By so doing, 5.3 g. (crop 2) of Me-NENA, melting at 37–38° C., was obtained.

The combined crops totaled 75.4 g. which is 91.4 per cent of the theoretical yield.

(4) *The large scale preparation of Me-NENA.*—Into a one-liter four-necked flask provided with stirrer, thermometer, and two dropping funnels there was placed a solution consisting of 37.5 g. (0.5 mole) methyl ethanolamine and 67.7 g. (1.05 moles) of 98% nitric acid. This mixture was prepared as described in procedure A. There was then added concurrently and simultaneously 187.5 g. (2.5 moles) of methyl ethanolamine and 338.5 g. (5.25 moles) of 98% nitric acid. The temperature throughout the addition was kept at 10–15° C.

The three mole mixture of alkamine dinitrate was transferred to a dropping funnel and added to a solution of 708 g. (6.6 moles) of acetic anhydride and 5.2 g. (0.066 mole) of acetyl chloride contained in a three-liter flask. Moderate stirring was employed and the reaction maintained at 35° C. The addition required twenty minutes. After the addition the reaction was stirred for fifteen minutes at the same temperature and then poured over 3300 cc. of ice and water. Me-NENA precipitated and was filtered and washed with three 300 cc. portions of water. There was obtained 416 g. of the substance, melting at 37–38° C.

The filtrate containing the washings was neutralized with a calculated amount of sodium carbonate. Approximately 20 g. of additional product was obtained. This was recrystallized from ether and there was obtained 14 g. of second crop Me-NENA, M. P. 38–39° C.

Total yield: 86.9 per cent.

(5) *Solubility of Me-NENA.*—Since Me-NENA is very soluble in both glacial acetic acid and aqueous acetic acid and is slightly soluble in water (.76 g./100 cc.), the isolation of this substance in the maximum possible yield from the diluted reaction mixture is dependent upon the solubility of Me-NENA in aqueous acetic acid. Table VII shows the solubility of Me-NENA in various concentrations of aqueous acetic acid (0–50 per cent).

TABLE VIII.—SOLUBILITY OF Me-NENA IN AQUEOUS ACETIC ACID AT 25° C.

| HOAc (percent) | Sol. of Me-NENA (g./100 cc. of solvent) | Sol. of Me-NENA (g./100 g. of solvent) |
| --- | --- | --- |
| 0 | 0.759 | 0.759 |
| 10 | 1.18 | 1.17 |
| 20 | 1.46 | 1.42 |
| 30 | 3.67 | 3.53 |
| 40 | 6.92 | 6.60 |
| 50 | 11.9 | 11.2 |

The maximum precipitation of Me-NENA occurs at approximately 20 per cent acetic acid. Consequently, the isolation of Me-NENA from the reaction mixture is preferably carried out by quenching the mixture with sufficient water to give a 20 per cent acetic acid solution.

(6) *Optimum temperature in preparation of Me-NENA.*—A series of experiments employing theoretical quantities of methyl ethanolamine and nitric acid with a 10 per cent excess of acetic anhydride showed clearly that the optimum second-stage temperature for the preparation of Me-NENA was about 25–35° C. The results of experiments carried out at different temperatures are listed in Table IX.

TABLE IX.—EFFECT OF VARYING THE SECOND-STAGE TEMPERATURE IN THE PREPARATION OF Me-NENA

| Run No.[1] | Temp. (2d stage) (° C.) | Me-NENA Crop I (g.) | Percent Yield | M. P. (° C.) |
|---|---|---|---|---|
| 12 | 5 | 0 | 0 | |
| 11 | 15 | 35.5 | 43.0 | 37–38 |
| 10 | 25 | 66.4 | 80.5 | 37.5–38 |
| 7 | 35 | 66.1 | 80.1 | 38–39 |
| 8 | 45 | 63.2 | 76.6 | 37.5–38.5 |
| 9 | 55 | 60.0 | 72.7 | 38–38.5 |

[1] Procedure B of Example II was followed, employing the temperatures indicated in the table.

Table X lists the results of experiments in which the addition of the amine-nitric acid solution to acetic anhydride was carried out at different temperatures and then allowed to remain at 40° C. for twenty minutes. The yields in all cases were fairly uniform, falling off somewhat at higher temperatures.

TABLE X.—PREPARATION OF Me-NENA AT VARIOUS SECOND-STAGE TEMPERATURES FOLLOWED BY "DIGESTION" AT 40° C.[1]

| Run No. | Addition Temp. (° C.) | Holding Temp. (° C.) | Me-NENA Crop I (g.) | Percent Yield | M. P. (° C.) |
|---|---|---|---|---|---|
| 2 | 5 | 40 | 58.6 | 71.0 | 37–38 |
| 1 | 15 | 40 | 64.6 | 78.3 | 38–39 |
| 3 | 25 | 40 | 64.6 | 78.3 | 37.5–38.5 |
| 4 | 35 | 40 | 66.2 | 80.3 | 37–37.5 |
| 5 | 45 | 40 | 63.4 | 76.9 | 38–39 |
| 6 | 55 | 40 | 57.3 | 69.5 | 38–39 |

[1] Procedure A of Example II was employed.

The catalyzed "dehydration" reaction occurring during the second stage of the present process is subject to the influence of temperature and time, as shown in Table XI. Runs 11 and 14 (in which the holding time or "digestion period" was 15 and 120 minutes, respectively, at 15° C.) showed a marked difference in the yields of Me-NENA. The yield in the former was 43 per cent, whereas the yield in the latter was 68.4 per cent. At a higher temperature the reaction was completed in a relatively short time. Runs 8 and 13 showed slight variations in the yield when the holding time was 15 and 0 minutes. It is quite probable that at moderately elevated temperatures some decomposition of Me-NENA by the acid solution occurs.

TABLE XI.—EFFECT OF SECOND-STAGE HOLDING TIME IN THE PREPARATION OF Me-NENA

| Run No.[1] | Temp. (° C.) | Holding Time (min.) | Me-NENA Crop I (g.) | Percent Yield | M. P. (° C.) |
|---|---|---|---|---|---|
| 9 | 15 | 15 | 35.5 | 43.0 | 38–39 |
| 14 | 15 | 120 | 68.4 | 82.9 | 37–38 |
| 8 | 45 | 15 | 63.2 | 76.6 | 37.5–38.5 |
| 13 | 45 | 0 | 63.9 | 77.5 | 37–38 |

[1] Procedure B of Example II was followed subject to the variation in temperature and holding time indicated in the table.

(7) *Influence of varying amounts of acetic anhydride in the preparation of Me-NENA.*—The results of several experiments disclosed that a slight excess of acetic anhydride over the theoretical requirement (i. e., about 10 per cent excess) gave somewhat better yields. Increasing the quantity of acetic anhydride from 1.1 mole to 1.4 mole per 0.5 mole methyl ethanolamine did not improve the recovery. The results of the experiments are given in Table XII.

TABLE XII.—VARIATION IN PROPORTION OF ACETIC ANHYDRIDE IN THE PREPARATION OF Me-NENA

| Run No.[1] | $Ac_2O$ (moles) | Me-NENA Crop I (g.) | Percent Yield | M. P. (° C.) |
|---|---|---|---|---|
| 20 | 0.9 | 53.7 | 65.1 | 37–38.5 |
| 27 | 1.0 | 62.5 | 65.8 | 37–38 |
| 7 | 1.1 | 66.1 | 80.1 | 38–39 |
| 25 | 1.2 | 65.8 | 79.8 | 37–38 |
| 26 | 1.3 | 64.9 | 78.7 | 37.5–38 |
| 28 | 1.4 | 65.0 | 78.8 | 37.5–38.5 |

[1] Procedure B of Example II (0.5 mole run) was followed, varying only the moles of acetic anhydride. In isolating the product the reaction was quenched with enough ice and water to give a 20 percent solution of acetic acid.

(8) *Influence of varying amounts of nitric acid on preparation of Me-NENA.*—The influence of varying amounts of nitric acid is summarized in Table XIII. There is a very slight increase in the yield of Me-NENA when the amount of nitric acid is varied from 1.00 mole to 1.20 moles per 0.50 mole of methyl ethanolamine.

TABLE XIII.—EFFECT OF NITRIC ACID IN THE PREPARATION OF Me-NENA [1]

| Run No. | $HNO_3$ (moles) | Me-NENA Crop I (g.) | Percent Yield | M. P. (° C.) |
|---|---|---|---|---|
| 7 | 1.00 | 66.1 | 80.1 | 38–39 |
| 23 | 1.05 | 66.5 | 80.6 | 37–38 |
| 19 | 1.10 | 66.7 | 80.8 | 37–38 |
| 35 | 1.20 | 67.5 | 81.8 | 37–38 |

[1] Procedure B was followed.

(9) *Catalysts in the preparation of Me-NENA.*—It appears from an examination of Table XIV that the catalytic effect of the chloride or bromide ion is essential for the conversion of the nitrate of N-(2-nitroxyethyl)-methylamine into Me-NENA. This is borne out by runs 22 and 31. In the former no catalyst was employed; in the latter sulfuric acid was used. In each of these experiments no Me-NENA was isolated.

The yield of Me-NENA is also subject to the influence of the concentration of halide ion and as it is observed in Table XIV; in experiments employing zinc chloride, there is an optimum concentration at which the catalyst is most effective. The highest yield was obtained when 0.011 mole of zinc chloride per 0.50 mole of methyl ethanolamine was used.

Other chlorides, it was found, were equally as effective as zinc chloride. Acetyl chloride, aluminum chloride, ammonium chloride, sodium chloride and hydrochloric acid gave excellent yields and ferric chloride was somewhat less effective. The results also showed that potassium chlorate and sodium hypochlorite were effective catalysts while potassium dichromate and sodium sulfite were without effect.

TABLE XIV.—CATALYTIC STUDIES ON Me-NENA [1]

| Exp. No. | Catalyst | Catalyst (moles) | Me-NENA (g.) | Yield (percent) | M. P. (° C.) |
|---|---|---|---|---|---|
| 22 | | 0 | 0 | 0 | |
| 26 | ZnCl₂ | 0.0007 | 14.4 | 17.5 | 37–38 |
| 25 | ZnCl₂ | 0.0037 | 69.3 | 84.0 | 37–38 |
| 24 | ZnCl₂ | 0.011 | 70.1 | 85.0 | 37.5–38 |
| 23 | ZnCl₂ | 0.022 | 66.5 | 80.6 | 37–38 |
| 27 | ZnCl₂ | 0.074 | 57.6 | 72.2 | 37–38 |
| 28 | AcCl | 0.011 | 71.4 | 86.5 | 37.5–38.5 |
| 29 | AlCl₃ | 0.011 | 69.1 | 83.8 | 37–38 |
| 30 | NH₄Cl | 0.011 | 70.4 | 85.3 | 37–38 |
| 31 | H₂SO₄ | 0.011 | 0 | 0 | |
| 32 | NaCl | 0.011 | 70.6 | 85.6 | 37.5–38.5 |
| 33 | HCl | 0.011 | 67.9 | 82.3 | 37–38 |
| 34 | FeCl₃ | 0.011 | 64.4 | 78.1 | 37–38 |
| A | KClO₃ | 0.011 | 67.2 | 81.5 | 37.5–38.5 |
| D [2] | KClO₃ | 0.011 | 5.7 | 6.9 | 38–39 |
| C | KClO₃ | 0.0007 | 0 | 0 | |
| E | NaOCl | 0.011 | 55.2 | 67.0 | 37.5–38.5 |
| B | Na₂SO₃ | 0.011 | 0 | 0 | |
| F | K₂Cr₂O₇ | 0.011 | 0 | 0 | |

[1] Procedure C was used.
[2] Exp. D was run at 15° C. whereas the other runs were at 35° C.

*Example III.—Two-stage, liquid-feed preparation of N-(2-nitroxyethyl)ethylnitramine (Et-NENA)*

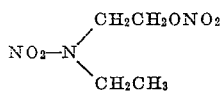

Into a 500 cc., three-necked flask containing 67.7 g. (1.05 moles) of 98 per cent nitric acid and equipped with stirrer, thermometer and a capillary tipped dropping funnel whose end was immersed below the surface of the acid, there was added 44.5 g. (0.5 mole) of ethyl ethanolamine. The contents of the flask were cooled externally and the temperature maintained below 10° C. during the addition.

The amine-nitric acid mixture was transferred to a dropping funnel and added dropwise to a solution of 118 g. (1.1 moles) of 95 per cent acetic anhydride and 0.86 g. (0.011 mole) of acetyl chloride contained in a 500 cc., three-necked flask. Moderate stirring was employed and the reaction was maintained at 35° C. After the addition of the amine-nitric acid mixture which required fifteen minutes, the reaction was kept at 35° C. for an additional fifteen minutes. After pouring the contents of the flask into 550 cc. of ice and water there was obtained an oil which was separated and washed successively with two 100 cc. portions of 5 per cent sodium bicarbonate and two 100 cc. portions of water. After filtering, the pale yellow oil was dried by bubbling dry air through it. There was obtained 73.4 g. (82 per cent of theoretical) of N-(2-nitroxyethyl)ethyl-nitramine melting at 4–5.5° C.

$$D_4^{25}=1.32; \ n_D^{25}=1.479$$

Theoretical molecular refraction=38.75.
Observed molecular refraction=38.4.

*Example IV.—Two-stage, liquid-feed preparation of N-(2-nitroxypropyl)methylnitramine (Me₂-NENA)*

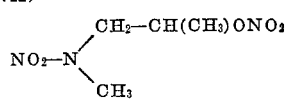

Into a 500 cc., three-necked flask fitted with stirrer, thermometer, and a capillary tipped dropping funnel whose end could be immersed well below the surface of the reaction mixture there was placed 67.7 g. (1.05 moles) of 98 per cent nitric acid. To this there was added by means of the dropping funnel 44.5 g. (0.5 mole) of 2-hydroxypropylmethylamine. The contents of the flask were externally cooled to a temperature below 10° C. and maintained at this temperature during the addition.

The amine-nitric acid mixture was transferred to a dropping funnel and added dropwise to a solution of 118 g. (1.1 moles) of 95 per cent acetic anhydride and 0.86 g. (0.11 mole) of acetyl chloride contained in a 500 cc., three-necked flask. Moderate stirring was employed and the reaction was maintained at 35° C. After the addition of the amine-nitric acid mixture which required fifteen minutes, the reaction was kept at 35° C. for an additional fifteen minutes. After pouring the contents of the flask into 550 cc. of ice and water there was obtained an oil which was separated and washed successively with two 100 cc. portions of 5 per cent sodium bicarbonate and two 100 cc. portions of water. After filtering, the pale yellow oil was dried by bubbling dry air through it. There was 65.8 g. (74 per cent of theoretical) of N-(2-nitroxypropyl)methylnitramine as a pale yellow oil, melting at 22–23° C.

We claim:

1. A method of preparing a nitroxyalkyl nitramine from a secondary amine of the class that (a) contains at least one alkanol group and (b) is capable of dissolving in an approximately equivalent amount of substantially anhydrous nitric acid to form a liquid reaction mixture, which method comprises mixing said secondary amine with about an equivalent proportion of substantially anhydrous nitric acid and then bringing the resulting liquid reaction mixture into reactive relation with about an equivalent proportion of a dehydrating acid anhydride in the presence of a small proportion of a halide-ion-forming catalyst selected from the group consisting of chlorine and bromine.

2. A method of preparing a nitroxyalkyl nitramine from a secondary amine of the class that (a) contains at least one alkanol group and (b) is capable of dissolving in an approximately equivalent proportion of substantially anhydrous nitric acid to form a liquid reaction mixture, which method comprises: mixing said secondary alkanolamine with about an equivalent proportion of substantially anhydrous nitric acid; then bringing the resulting liquid reaction mixture into reactive relation with about an equivalent proportion of a dehydrating acid anhydride in the presence of a halide-ion-forming catalyst selected from the group consisting of chlorine and bromine to form a second reaction mixture; maintaining said second reaction mixture at a temperature between about 5° C. and about 50° C.; and then separating the nitroxyalkylnitramine from said second reaction mixture.

3. The method of claim 2 wherein said first stage reaction mixture is cooled to about room temperature before being brought into reactive relation with said anhydride.

4. The method of claim 2 wherein said anhydride is a lower fatty acid anhydride.

5. The method of claim 2 wherein said anhydride is acetic anhydride.

6. The method of claim 2 wherein said secondary amine contains at least two alkanol groups.

7. In the preparation of bis(2-nitroxyethyl) nitramine, the improvement which comprises: mixing about one mole of diethanolamine with about three moles of substantially anhydrous nitric acid to form a liquid mixture; cooling said liquid mixture to a temperature above about 10° C. but below about 50° C.; bringing the resulting liquid mixture into reactive relation, at a reaction temperature between about 5° C. and about 60° C. and in the presence of a catalytic amount of a chloride-ion-forming catalyst, with about three moles of a lower fatty acid anhydride; mixing the resulting reaction mixture with a large proportion of water; and separating the resulting precipitate from the mother liquor.

8. The improvement of claim 7 wherein said anhydride is acetic anhydride.

9. The improvement of claim 7 wherein said catalyst is hydrogen chloride.

10. A method of preparing N-(2-nitroxyalkyl)-alkylnitramine which comprises bringing about one mole of N-(2-hydroxyalkyl)alkylamine into reactive relation with about 2 to about 2.2 moles of nitric acid to form a liquid reaction mixture; bringing said liquid mixture into reactive relation with about 1.6 to about 3 moles of a dehydrating fatty acid anhydride, in the presence of a halide-ion-forming catalyst selected from the group consisting of chlorine and bromine and at a reaction temperature between about 5° C. and about 60° C.; and then separating the N-(2-nitroxyalkyl)alkylnitramine from the reaction mixture.

11. A method of preparing N-(2-nitroxyalkyl)-alkylnitramine which comprises: mixing about one mole of N-(2-hydroxyalkyl)alkylamine with about 2 to about 2.2 moles of substantially anhydrous nitric acid to form a liquid reaction mixture; bringing the resulting liquid mixture into reactive relation, at a temperature between about 35° C. and about 45° C. and in the presence of a halide-ion-forming material selected from the group consisting of chlorine and bromine, with about 1.6 to about 2.3 moles of a lower fatty acid anhydride; diluting the resulting reaction mixture with water and separating the precipitated N-(2-nitroxyalkyl)alkylnitramine from the mother liquor.

References Cited in the file of this patent

Bamberger, "Berichte Deut. Chem. Gesell.," vol. 28, pp. 399 to 402, 537, 538 (1895).